United States Patent [19]

Pilling et al.

[11] Patent Number: 5,114,516
[45] Date of Patent: May 19, 1992

[54] METHOD FOR PULTRUDING FIBER-REINFORCED, THERMOPLASTIC STOCK

[75] Inventors: Douglas A. Pilling, San Pedro; George Korzeniowski, Sherman Oaks, both of Calif.

[73] Assignee: Aluminum Company of America, Pittsburgh, Pa.

[21] Appl. No.: 593,185

[22] Filed: Oct. 5, 1990

[51] Int. Cl.$^5$ .......................... D04H 3/12; B32B 1/00
[52] U.S. Cl. .................................. 156/180; 156/166; 156/245; 156/133
[58] Field of Search ............... 156/180, 166, 245, 433; 264/174, 280; 425/112, 116, 122, 123

[56] References Cited

U.S. PATENT DOCUMENTS

| | | | |
|---|---|---|---|
| 3,993,726 | 11/1976 | Moyer | 264/280 |
| 4,058,581 | 11/1977 | Park | 264/136 |
| 4,419,400 | 12/1983 | Hindersinn | 428/245 |
| 4,445,951 | 5/1984 | Lind et al. | 156/93 |
| 4,541,884 | 9/1985 | Cogswell et al. | 156/166 |
| 4,549,920 | 10/1985 | Cogswell et al. | 156/181 |
| 4,549,920 | 10/1985 | Cogswell et al. | 156/181 |
| 4,559,262 | 12/1985 | Cogswell et al. | 428/294 |
| 4,590,027 | 5/1986 | Murphy et al. | 264/135 |
| 4,743,413 | 5/1988 | Galichon | 264/24 |
| 4,754,015 | 6/1988 | Thorsted, Jr. | 528/94 |
| 4,804,427 | 2/1989 | Paul et al. | 156/181 |
| 4,820,366 | 4/1989 | Beever et al. | 156/433 |
| 4,842,667 | 6/1989 | Thorsted, Jr. | 156/166 |
| 4,883,552 | 11/1989 | O'Connor et al. | 156/441 |
| 4,921,558 | 5/1990 | Johnson | 156/161 |
| 4,956,039 | 9/1990 | Olesen et al. | 156/180 |

FOREIGN PATENT DOCUMENTS 1228573 4/1971 United Kingdom .
1485586 9/1977 United Kingdom .

OTHER PUBLICATIONS

"New Processes and Prospects in Pultrusion" by David E. Beck Feb. 1983.
"Nontraditional Pultrusion Processing Techniques", Jerome P. Fanucci e al., May 9-10, 1990 SME Meeting in Manhattan Beach, Cailf.
"Development of the Pultrusion Process for Aerospace Quality Structures", Marlene L. Paul, May 9-10, 1990, SME Meeting in Manhattan Beach, Cailf.
"Imbedded Fiber Optic Pressure and Temperature Sensors Enable Cure Monitoring of Pultruded Composite Materials", David Cable, May 9-10, 1990 SME Meeting in Manhattan Beach, Cailf.

Primary Examiner—Michael W. Ball
Assistant Examiner—Daniel J. Stemmer
Attorney, Agent, or Firm—Gary P. Topolosky

[57] ABSTRACT

A method for making substantially continuous, fiber-reinforced resin stock without drawing the fibers through a separate resin bath comprises: providing a plurality of fiber layers and resin film layers for positioning into an array having fiber layers for its outermost layers. This array is passed, preferably pulled, through a die having an entrance, an exit downstream from the entrance, and a pool area adjacent the die entrance, said pool area having a larger cross-sectional configuration than that of the array. Upon heating of the die, the resin film layers of the array melt to form a pool of molten resin in the pool area of the die. The fiber layers passing through the die are impregnated with resin from the pool area before the resin-impregnated fibers are optionally shaped, then compressed and solidified to form resin stock. A pultrusion die for making substantially continuous, fiber-reinforced stock from a low viscosity thermoplastic resin is also disclosed.

20 Claims, 2 Drawing Sheets

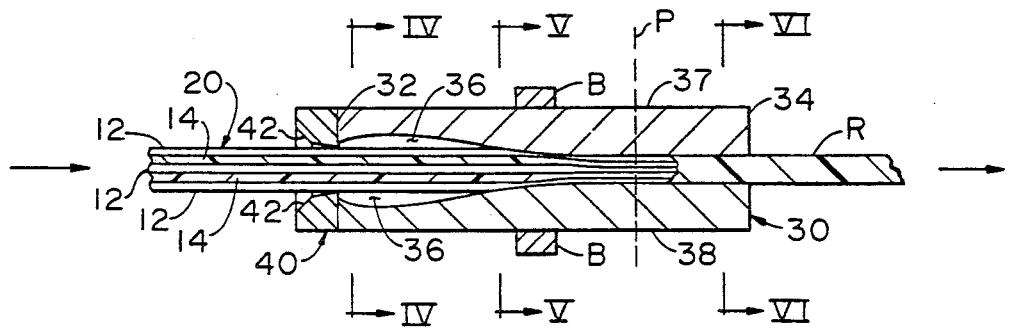
FIG. 3
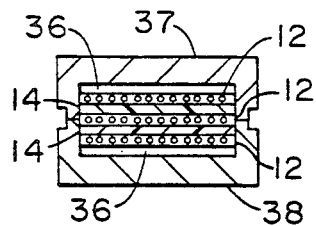 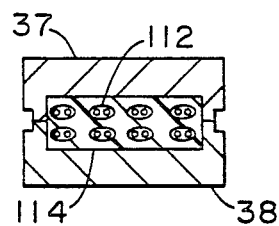 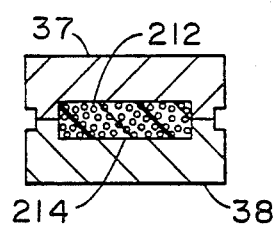
FIG. 4   FIG. 5   FIG. 6

METHOD FOR PULTRUDING FIBER-REINFORCED, THERMOPLASTIC STOCK

BACKGROUND OF THE INVENTION

1. Field of the Invention

This invention relates to the production of fiber-reinforced resin stock. More particularly, the invention relates to the pultrusion of fiber-reinforced stock with a low viscosity, thermoplastic resin. The invention further relates to an improved pultrusion die for making sheets of fiber-reinforced stock. The apparatus and method of this invention produce thermoplastic stock without having to draw the fiber reinforcements through a resin bath positioned upstream from the die.

2. Technology Review

It is generally known to reinforce materials by imbedding fibrous strands into a matrix. This is especially true for matrices comprised of thermosetting resins. In some instances, reinforcing fibers are cut into short lengths before being formed into a composite by pressure molding on an item-by-item basis. British Patent No. 1,228,573 teaches making a composite by positioning carbon filaments, from 1 mm to 1 meter in length, between layers of thermoplastic (TP) film. The filaments may be randomly ordered or laid in the form of fabric between adjacent layers of TP film. After orientation of the filaments, these materials are heated in a compression mold to make sheet, rod or block products.

The batch processing of fiber-reinforced resin stock is not very economical from a production standpoint. The performance levels of such batch products may differ due to inconsistencies in wetting the short fibers added to such composites for reinforcement purposes.

The pultrusion of thermosetting resin products is generally well known. Therein, fiberglass or carbon rovings are pulled from a creel and soaked in a liquid resin bath before being cured in the heating zone of a pultrusion die. Gripper means pull on cooled, pultruded product to advance additional roving through the resin bath and into the die.

The pultrusion of certain thermoplastic resins is more complicated. High viscosity thermoplastics produce inconsistent wet-outs of the rovings passing through their molten resin tanks. Thermoplastics also exhibit a greater tendency to degrade when held at or above their crystallization temperatures for too long. As they degrade, low viscosity TP resins undergo crosslinking reactions to become higher in molecular weight and viscosity. Thermal degradation can be minimized by passing fiber reinforcements through a fluidized bed of resin powders. Powder processing still leads to wetting problems and inconsistencies in fiber penetration.

SUMMARY OF THE INVENTION

It is a principal objective of this invention to provide inexpensive means for manufacturing stock shapes from a low viscosity thermoplastic resin. It is another objective to provide improved means for pultruding thermoplastic resins with substantially continuous fiber reinforcement throughout. It is another objective to provide a method for pultruding thermoplastic resins without having to pass fiber reinforcements through a trough or separate bath of molten polymer resin. It is yet another objective to provide means for making fiber-reinforced sheet, ribbon or film from thermoplastic resins thereby taking advantage of the impact resistance, moisture resistance and strength properties associated with various TP resins. It is another objective to provide a pultrusion method which may be adapted to form fiber-reinforced, thermoplastics into other product shapes.

It is a further objective of this invention to provide means for melting thermoplastic resin films, in situ, to thereby impregnate layers of dry fibrous product continuously fed into a heated, shaping die. It is yet another objective to provide means for pultruding laminates of thermoplastic and fiber without causing the layers of TP film feedstock array to melt prematurely, i.e., through contact with the entrance to a heated pultrusion die. It is another principal objective to provide a pultrusion die for making substantially continuous, fiber-reinforced resin stock by passing an array of dry fiber layers and resin film layers through the die, said array having dry fiber layers for its outermost surfaces.

In accordance with the foregoing objectives and advantages, there is provided a method for making substantially continuous, fiber-reinforced resin stock without drawing the fibers through a resin bath positioned upstream from a heated die. The method includes providing a plurality of fiber layers and resin film layers for positioning into an array having fiber layers for its outermost layers. This array is then passed through a die having an entrance, an exit downstream from the entrance, and a pool area adjacent the die entrance, said pool area having a larger cross-sectional configuration than that of the array as it passes through the die entrance. This pool area serves as a chamber for storing molten resin on either side of the array passing through the pool area.

The method proceeds by heating the array fed into the die to melt the resin film layers of the array. Such heating causes a pool of molten resin to form in the pool area of the die. Resin from this pool is then, used to commingle about and impregnate the fiber layers passing through the die. At or near the die's exit, resin-impregnated fibers are shaped, compressed or consolidated, and finally solidified to form fiber-reinforced resin stock. In order to solidify such stock, rapid cooling or chilling means are employed. Such cooling means may be positioned within the pultrusion die itself, outside and downstream from the die, or at both locations. Typical gripping and pulling means then pull on solid feedstock thereby advancing additional array into the die entrance area. On a preferred basis, this method produces thermoplastic resin stock having about 30–90% by weight continuous fiber reinforcement therethrough. Preferred resins are selected from polyethylene and/or polypropylene while preferred fiber layers include materials selected from fiberglass, carbon and/or graphite.

A pultrusion die for making substantially continuous, fiber-reinforced thermoplastic stock is also disclosed. This die includes an entrance and exit area, an inwardly tapering heating zone for heating the resin film layers of an array passing through the die, means for maintaining a pool of molten resin adjacent the die entrance, at least one zone for impregnating molten resin through the fiber layers of the array, and a shaping/solidification zone. On a preferred basis, this die further includes a cooling die adjacent the die exit.

BRIEF DESCRIPTION OF THE DRAWINGS

Further features, other objectives and advantages of this invention will be made clearer from the following detailed description of preferred embodiments made with reference to the drawings in which:

FIG. 3 is a sectional view taken along lines III—III of FIG. 2;

FIG. 4 is a sectional view taken along lines IV—IV of FIG. 3;

FIG. 5 is a sectional view taken along lines V—V of FIG. 3; and

FIG. 6 is a sectional view taken along lines VI—VI of FIG. 3.

DETAILED DESCRIPTION OF THE PREFERRED EMBODIMENTS

As used herein, the term "substantially continuous" shall mean continuous to the extent physically possible in typical pultrusion processing. Natural constraints limit the size of spools used to feed resin and fiber materials to the pultrusion die of this invention. When one roll of feedstock nears its end, it may be necessary to overlap some area of resin and/or fiber during changing of the spools. There may also be some interruption, though brief, from the flow of any given feedstock to the pultrusion die described in detail below.

The term "cross-sectional configuration" describes the relative top-to-bottom thickness of the die entrance adapter, die entrance and array passing through these two items. The slit in the entrance adapter of this die has preferred dimensions equal to or only slightly larger than those of the array (before compression). A snug fit, especially between the lower edge of the adapter and this array, will deter molten resin from flowing back and out of the die entrance. An ideal die entrance adapter would hug the array passing therethrough from all sides while accommodating any bumps or other imperfections which may occur in the array feedstock. Until such an adapter is made, the pultrusion system of FIG. 1 will be fitted with a tray T for catching any molten resin which may happen to flow back from or leaking out of the die entrance.

Figure 1:
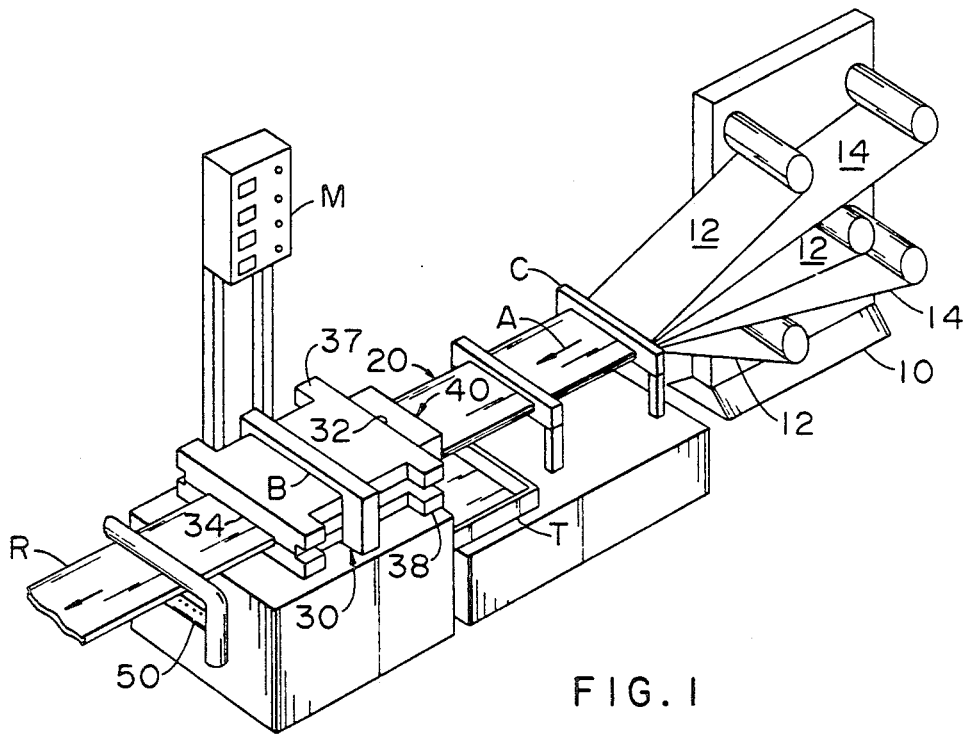
FIG. 1 is a perspective view illustrating equipment for dry pultruding resin stock according to this invention.

Referring now to FIG. 1, there is shown a pultrusion system for practicing preferred methods of the invention. The system includes a spool rack, generally 10, upon which are positioned a plurality of spools, each spool containing dry fiber layers 12 and thermoplastic resin film layers 14, respectively. As shown, dry fiber layers 12 are alternated with resin film layers 14 before passing through a collator C in the direction of arrow A to form array 20. Still other layering configurations are available with this invention. Spool stand 10 may be arranged to provide pairs of dry fiber layers for sandwiching each thermoplastic resin film layer. Multiple layers of film and/or fiber may be placed adjacent one another so long as the outermost layers of array 20 consist of dry fiber. By keeping the thermoplastic film layers from direct contact with the heated, pultrusion die entrance, this invention will prevent thermoplastic film in array 20 from melting prematurely, i.e, outside the die.

In FIG. 1, shaping device S is positioned downstream from collator C. This device provides a particular pre-shape to the array 20 before it enters the pultrusion die described hereinafter. A generally planar shape is imparted to the feedstock from shaping device S. It is to be understood, however, that various other configurations, including L-bars, C-shapes, J-shapes and rods, may be continuously pultruded with only minor modification to the apparatus and method of this invention.

Figure 2:
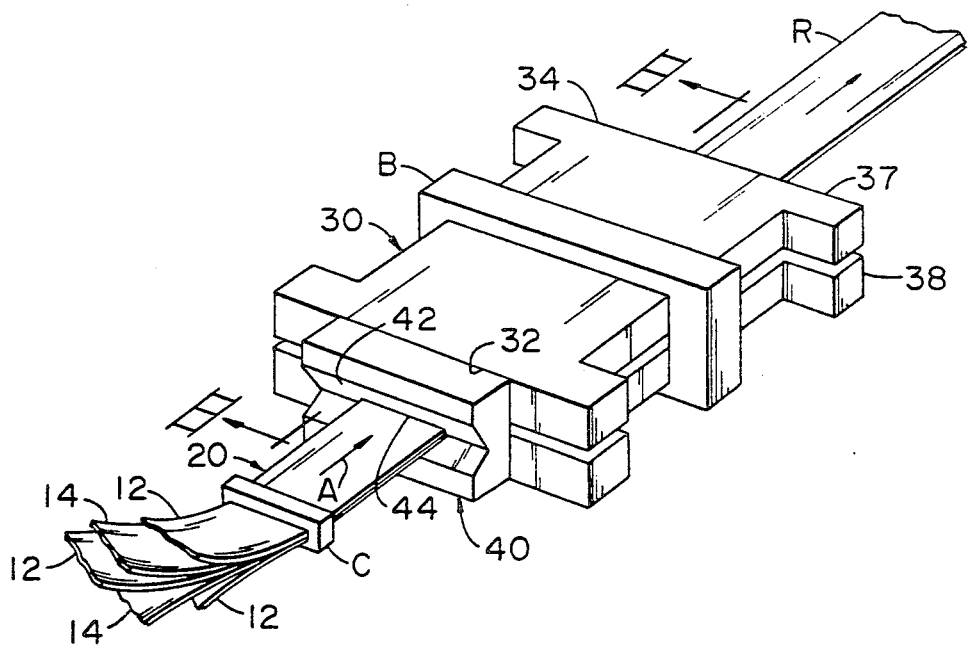
FIG. 2 is a perspective view of one pultrusion die embodiment.

After collation and optional preshaping, array 20 is passed through a pultrusion die, generally 30, as shown in more detail in FIGS. 2 and 3. The die includes an entrance 32, exit 34, and pool area 36 adjacent the die entrance 32. The pool area 36 actually defines a void or chamber about the array passing therethrough. In FIG. 3, pool area 36 defines chambers both above and below array 20. It is to be understood, however, that such chambers may also run from side to side, or around various sections of a nonplanar pultruded stock shape. Such chambers result from providing the die with a larger cross-sectional configuration at pool area 36 than that of the array 20 passing through die entrance 32. Because of its size and location, pool area 36 provides means for holding molten resin within the entrance portion of die 30. Molten resin is not purposefully added to, or injected into, these pool areas 36. Instead, such pools form as the array is heated while passing through the entrance portion of die 30.

In FIG. 3, die 30 consists of a single heating zone which tapers inwardly from both top and bottom toward die exit 34. Both the top platen 37 and bottom platen 38 of die 30 converge along their inner chambers, therefore. These two platens are then held together with clamping, bolting or banding means B. In alternative embodiments, not shown, die 30 may also be provided with multiple heating zones of a single, solid die, with staged, staggered or stepped zones, or with a plurality of individual die zones connected together in series.

Intermediate the entrance and exit of die 30, other pultrusion processes are performed on the array 20 being passed therethrough. Fiber layers of this array 20 are first commingled or impregnated with molten resin from pool area 36. As these wetted fibers approach the substantially parallel area of die 30 (which area commences with dotted line P in FIG. 3), final shaping, compression and solidification of the resin stock takes place. During such shaping and compression, excess resin from the pultruded stock is channeled back into pool area 36.

In order to discourage molten resin from flowing back through die entrance 32, this pultrusion die is provided with a die entrance adapter 40 consisting of inwardly tapering walls 42 for defining a slitted area 44 through which array 20 passes. Slit 44 is intended to have a smaller cross-sectional configuration than that of die entrance 32. Such relative sizing enables the invention to maintain a pool of molten resin behind the tapering walls of adapter 40. On a preferred basis, adapter 40 is neither heated nor cooled. It should be insulated from the heated die entrance area, however. Should complications arise through premature melting of the resin layers fed to this die, adapter 40 may be purposefully, continuously cooled by known or subsequently developed techniques. For some thermoplastics, resin degradation may commence while it circulates repeatedly about pool area 36. To prevent such degradation, fillers, UV gradients, inhibitors and other polymer additives may be added to the resin film layers of array 20, or through periodic injection into pool area 36.

As array 20 passes through die 30, the fiber layers are believed to progressively orient themselves in the manner shown in FIGS. 4 through 6. Initially, thermoplastic resin film layers 14 are distinctly divided from the dry fiber layers 12, especially those fiber layers in contact with the pool areas 36 of die entrance 32 (FIG. 4). With heating of the array, the resin films melt to form a pool around commingling fibers. This produces an intermediate collection of fiber clusters 112 in a semi-solidified, semi-molten pool of resin 114 as in FIG. 5. With shaping, compression and cooling, commingled fibers 212 consolidate in a randomly ordered, solid matrix 214 (FIG. 6).

Consolidated resin/fiber materials should be at least partially cooled before exiting die 30 to form resin stock R. Should faster cooling be desired or necessitated by faster line speed processing, the system can be supplemented with a pair of slotted tubes 50 for providing jets of cool air to both sides of resin stock R. The speed at which resin stock R cools is critical as in most pultrusion processes. If chilling occurs too early, the array will freeze within the die and block further pultrusion therethrough. Should chilling take place too late, the resulting resin stock will "bloom" or swell. Generally known gripper and pulling means are located downstream from slotted tubes 50. Such means have been omitted from the pultrusion system depicted in FIG. 1, however. In order to carefully monitor pultrusion speed and various heating/cooling temperatures, the pultrusion system of this invention is also provided with known monitoring means M.

The method of this invention works well with rovings or other pultrudable fabric forms made from fiberglass, carbon and/or graphite. On a less preferred basis, aramid, Kevlar ® or boron fibers may be used for dry feedstock. Thin sheets of these fibers may be combined with one or more of the following resin types: a polyamide, polyester, polyolefin, polytetrafluoroethylene (PTFE) and/or polycarbonate. Suitable polyolefin forms include: an acrylic acid modified polyolefin, polyvinyl halide, polyether, polyvinylidine halide, polystyrene and/or polycarbanic acid. The invention works especially well with feedstocks of polypropylene and/or polyethylene (both HDPE and LDPE). On a preferred basis, this method produces fiber-reinforced resin stocks with as much as 30-90% by weight fiber reinforcement therein. More preferably, these resin stocks have about 45-60% by weight fiber reinforcement.

With polypropylene and/or polyethylene, die temperatures between about 600°-800° F. are needed to produce fiber-reinforced stock at speeds of about 6-8 feet per minute. Still higher speeds may be achievable with advancements in pultrusion equipment, the incorporation of lubricants or other additives into the resin films, or with the use of still lower viscosity thermoplastics.

EXAMPLES

With a single, tapered heating die, similar to that of FIG. 2, a continuous strip containing 50% by weight carbon fiber and 50% by weight polypropylene was pultruded. The strip had an overall thickness of about 0.05 inch and an overall width of about 0.313 inch.

Having described the presently preferred embodiments, it is to be understood that the invention may be otherwise embodied within the scope of the appended claims.

What is claimed is:

1. A method for making substantially continuous, fiber-reinforced resin stock without drawing fibers through a resin bath positioned upstream from a heated die, said method comprising:
    (a) providing a plurality of sheet-like fiber layers;
    (b) providing a plurality of sheet-like resin film layers;
    (c) positioning the fiber layers and resin film layers in an array whose outermost layers are fiber layers for preventing the film layers from melting prematurely;
    (d) passing the array through a die having an entrance, an exit downstream from the entrance, and a pool area adjacent the die entrance, said pool area having a larger cross-section than the array for holding molten resin adjacent the entrance of the die;
    (e) heating the die to melt the resin film layers of the array and form a pool of molten resin in the pool area;
    (f) impregnating the fiber layers of the array with molten resin from the pool area the film layers of said array being substantially the sole source of resin supply to the pool area;
    (g) compressing the resin-impregnated fiber layers adjacent the die exit to form fiber-reinforced resin stock; and
    (h) solidifying the fiber-reinforced resin stock.

2. The method of claim 1 which further comprises shaping the array prior to step (g).

3. The method of claim 1 wherein gripping means pull the array through the die.

4. The method of claim 1 wherein the die includes a plurality of heat zones which taper inwardly toward the die exit.

5. The method of claim 1 wherein the die includes means for reducing molten resin backflow from the die entrance.

6. The method of claim 5 wherein the backflow reducing means includes a die entrance adapter having inwardly tapered walls for defining a slit through which the array passes, said slit having a smaller cross-sectional configuration than the die entrance.

7. The method of claim 1 wherein the resin is a low viscosity thermoplastic selected from the group consisting of: a polyamide, polyester, polyolefin, polytetrafluoroethylene, polycarbonate and blends thereof.

8. The method of claim 1 wherein the resin is selected from polyethylene, polypropylene or blends thereof.

9. The method of claim 1 wherein the fiber layer comprises a material selected from the group consisting of: fiberglass, carbon, graphite and mixtures thereof.

10. The method of claim wherein fiber layers and resin film layers alternate within the array.

11. A method for producing thermoplastic resin stock having about 30-90% by weight continuous fiber reinforcement, said method comprising:
    (a) positioning a plurality of sheet-like dry fiber layers and resin film layers in an array whose outermost layers are dry fiber layers for preventing the film layers from melting prematurely through contact with a heated surface;
    (b) pulling the array through a die having:
        (i) an entrance and an exit;
        (ii) a tapered, heating zone for melting the resin film layers of the array;
        (iii) means for maintaining a pool of molten resin at or near the die entrance the film layers being substantially the sole source of resin supply to said pool; and (iv) at least one zone for impregnating the fiber layers with molten resin;

(c) compressing resin-impregnated fiber layers into resin stock; and (d) cooling the resin stock.

12. The method of claim 11 wherein the resin pool maintaining means includes a die entrance adapter having inwardly tapering walls for defining a slit through which the array passes, said slit being sized smaller than the die entrance and approximately equal to the thickness of the array passing therethrough.

13. The method of claim 11 wherein the resin is selected from polyethylene, polypropylene or blends thereof.

14. The method of claim 11 wherein the dry fiber layer comprises a material selected from the group consisting of: fiberglass, carbon, graphite and mixtures thereof.

15. The method of claim 11 wherein each resin film layer of the array is sandwiched by a pair of dry fiber layers.

16. The method of claim 11 wherein the resin stock has about 45-60% by weight fiber reinforcement.

17. A method for pultruding fiber-reinforced, thermoplastic resin into substantially continuous sheet stock comprises:

(a) pulling through a heated die an array of alternating sheets of dry fiber and thermoplastic film layers, said array having dry fiber layers on its outermost surfaces for preventing the film layers from melting prematurely, said die including:

(i) an entrance and an exit;

(ii) a tapered, heating zone for melting the film layers of the array;

(iii) means for maintaining a pool of molten thermoplastic resin at or near the die entrance, the film layers of said array being substantially the sole source of resin supply to said molten pool;

(iv) a zone for impregnating molten thermoplastic resin into the fiber layers of the array; and (v) a zone for shaping and compressing the thermoplastic-impregnated fibers into sheet stock; and (b) cooling the sheet stock exiting the die.

18. The method of claim 17 wherein the die include an entrance adapter having a plurality of inwardly tapered walls for defining a slit through which the array passes, said slit being sized smaller than the die entrance adjacent to the adapter.

19. The method of claim 17 wherein the resin is selected from polyethylene, polypropylene or blends thereof.

20. The method of claim 17 wherein the fiber layer comprises a material selected from the group consisting of: fiberglass, carbon, graphite and mixtures thereof.

* * * * *